United States Patent
Hermes et al.

(10) Patent No.: US 7,953,849 B2
(45) Date of Patent: May 31, 2011

(54) ASSET MONITOR FOR FIELDBUS DEVICES

(75) Inventors: Martin Hermes, Cleveland Heights, OH (US); Joerg Schubert, Lehrte (DE); Paolo Argentieri, Richmond Heights, OH (US)

(73) Assignee: ABB Inc., Cary, NC (US)

( * ) Notice: Subject to any disclaimer, the term of this patent is extended or adjusted under 35 U.S.C. 154(b) by 175 days.

(21) Appl. No.: 12/126,154

(22) Filed: May 23, 2008

(65) Prior Publication Data
US 2008/0294771 A1   Nov. 27, 2008

Related U.S. Application Data
(60) Provisional application No. 60/939,867, filed on May 24, 2007.

(51) Int. Cl.
G06F 15/173 (2006.01)
G06F 7/00 (2006.01)
(52) U.S. Cl. .......................... 709/224; 709/223; 701/29
(58) Field of Classification Search .................. 701/29, 701/36; 710/52, 53, 56, 310
See application file for complete search history.

(56) References Cited

U.S. PATENT DOCUMENTS

| | | | |
|---|---|---|---|
| 5,768,119 A * | 6/1998 | Havekost et al. | 700/4 |
| 5,995,916 A * | 11/1999 | Nixon et al. | 702/182 |
| 6,298,377 B1 * | 10/2001 | Hartikainen et al. | 709/223 |
| 6,633,782 B1 * | 10/2003 | Schleiss et al. | 700/26 |
| 7,062,580 B2 | 6/2006 | Donaires | |
| 7,146,230 B2 | 12/2006 | Glanzer et al. | |
| 7,162,534 B2 | 1/2007 | Schleiss et al. | |
| 7,246,156 B2 * | 7/2007 | Ginter et al. | 709/217 |
| 2005/0197805 A1 * | 9/2005 | Eryurek et al. | 702/188 |

* cited by examiner

Primary Examiner — Yemane Mesfin
(74) Attorney, Agent, or Firm — Paul R. Katterle

(57) ABSTRACT

A software product and method of monitoring a field device in an enterprise having an industrial process. A subscription to the OPC DA server for diagnostic data from the field device is made and a subscription to an OPC AE server for event notifications from the OPC AE server is made. The subscription to the OPC AE server is activated, but the subscription to the OPC DA server is not activated. When an event notification is received from the OPC AE server, the subscription to the OPC DA server is activated. Diagnostic data from the field device is received and device health information from the diagnostic data is generated. The device health information is displayed on a viewing monitor. The subscription to the OPC DA server is then deactivated.

22 Claims, 9 Drawing Sheets

FIG. 4

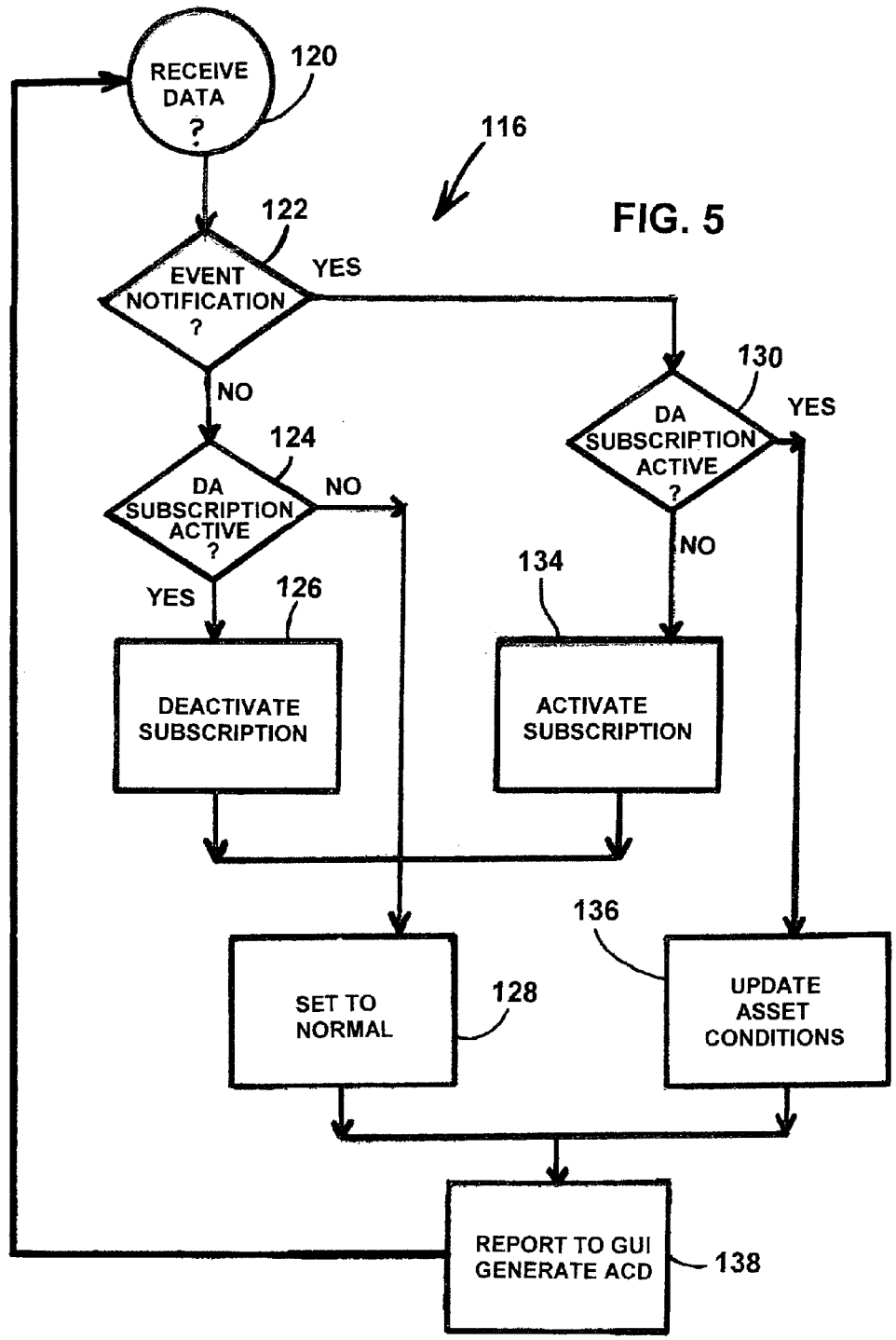

FF3A: FF Generic Device Asset Monitor "Input or Output Failure" Condition Details

[Condition Details] [Output Records] [Asset Monitor Status]

Condition: Input or Output Failure

| Condition: Subcondition: | Input or Output Failure: Yes |
|---|---|
| Timestamp | Friday March 23, 2007 1:55:04 PM |
| Severity | 1000 |
| Description | TRD2_0017 |
| Possible Cause: | Sensor is broken |
| Suggested Action: | Inspect and Repair or Replace Device |
| Corrective Action Taken: | |

Fig. 6

FF3A-G: Fault Report Submitter ▼

Select a CMMS Object [Maximo Equipment ▼]

FF3A – Fault Reports

| Severity | FR Status | Timestamp | FR State | AM Name | Condition | SubCondition |
|---|---|---|---|---|---|---|
| 1000 | Pending | 3/23/2007 1:55:04 PM | Most Severe Unacknowledged | FF3A | Input or Output Failure | Yes |

[Refresh]

Submit Fault Report

| | |
|---:|---|
| ACD State | Current |
| Condition Name | Input or Output Failure |
| Time | Friday March 23, 2007 1:55:04 PM |
| CMMS System Type | Maximo |
| Equipment | FF3A |
| Asset Monitor Aspect | FF DEVICE ASSET MONITOR |
| Asset Monitor Logic Description | NoAudit/None/Msg/Failure |
| WO Description | Inspect and Repair or Replace Device |
| User Comment | Inspect and Repair or Replace Device |
| Failure Date | Friday March 23, 2007 1:55:04 PM |
| Problem Reporter | Optimize IT |
| General Ledger Account | 6900-332-000 |
| WO Priority | High |
| Work Type | PR |
| Subwork Type | Major |
| Lead Craft | |

☑ Dismiss after successful submittal
☑ Add to Action List for Repair/Replacement
Select an Action List: [Dispatch Personnel]

[Submit Fault Report]

ASSET MONITOR FOR FIELDBUS DEVICES

CROSS-REFERENCE TO RELATED APPLICATION

This application claims the benefit of U.S. provisional patent application No. 60/939,867 filed on May 24, 2007, which is hereby incorporated by reference in its entirety.

BACKGROUND OF THE INVENTION

The present invention is directed toward asset monitoring and, more particularly, toward a system and method for monitoring field devices connected to a fieldbus.

In the past, industrial processes were generally controlled by central control systems connected to field devices, such as control valves, transmitters, etc. through 4-20 mA analog networks. In recent years, there has been a movement to replace 4-20 mA analog networks with digital networks. A typical digital network (often generically referred to as a "fieldbus") is a bi-directional, serial communications network to which "smart" field devices are connected. The field devices are "smart" in the sense that they have low-cost microprocessors for executing simple functions, such as diagnostic, control, and maintenance functions, as well as for providing bi-directional communication capabilities.

In an effort to promote the interoperability of smart field devices and controllers from different manufacturers, several fieldbus standards have been established. One of the most important of these standards is the standard established by the Fieldbus Foundation of Austin, Tex. This standard is known as the FOUNDATION fieldbus (FF) system. The FF system has three functional components, namely a physical layer, a user layer and a communication stack. These three components are derived from the Open Systems Interconnect (OSI) model.

The physical layer may be an H1 application and/or an HSE (High Speed Ethernet) application. The H1 application requires a single unshielded, twisted wire pair to provide both communication and power in an intrinsically safe manner to a field device. The H1 application has a relatively slow data rate of 31.25 kilobits/second. In contrast, the HSE application has a data rate of 100 megabits/second. It should be noted that the H1 application was developed to minimize constraints on cabling systems so as to permit many existing 4-20 mA twisted wire pairs to be used for fieldbus signals.

The user layer in the FF system is a function block application. An FF function block is a software module designed to perform a specific set of operations on or more inputs to generate one or more outputs. Function blocks reside in the various devices of a fieldbus network to implement a control strategy. A function block is evaluated, or executed, on a periodic basis under control of the device in which it resides. Communication among function blocks takes place through linkages that are established by a configuration procedure, before startup or during operation.

The communication stack recognizes several different classes of field devices including: link master, basic, linking device and gateway. A link master controls all communication in a fieldbus network. The link master contains a function called a link active scheduler (LAS) and is typically a host device located in a central control room. A basic device is capable of all basic communication required of a field device and interacts with the host device in a client/server manner, wherein the host device is the client and the basic device is the server. A linking device is used to connect an H1 segment to an HSE segment. Typically, a linking device connects several H1 segments to an HSE segment. The primary function of a linking device is to insert or remove an FF message into or from Ethernet message and to provide a routing function among the various segments and devices. A gateway device is used to connect an FF system to some other, non-FF system, such as a Modbus system.

The communication stack provides for three types of communication between field devices: publisher/subscriber, report distribution and client/server.

In publisher/subscriber communication, process data for real time control is transmitted on a precisely periodic time schedule (i.e., is cyclic data) to provide satisfactory dynamic control of plant processes. Such process data is buffered, i.e., current process data is transmitted and older process data is overwritten. In publisher/subscriber communication, process data is broadcast on a fieldbus network from a single source to any device needing the process, i.e., is "one-to-many".

Report distribution communication is used for alert data, which may be an alarm or an event. Unlike process data, alert data is queued, i.e., the alert data is not overwritten and is communicated at the earliest opportunity after the occurrence of the underlying event, rather than on a scheduled basis. Thus, alert data is non-cyclic data. The appropriate recipient of alert data must confirm receipt by sending a return confirmation. Otherwise, the original transmission of the alert data will be periodically re-transmitted. Report distribution communication is initiated by a sender and is "one-to-many", similar to publisher/subscriber communication.

For purposes of monitoring equipment assets, alarms and events can be categorized in two groups: (1.) alarms and events for plant operation, e.g. an alarm is activated when a process value meets or exceeds a preset limit; and (2) alarms and events reporting equipment status, e.g. "maintain equipment soon".

Client/server communication is similar to report distribution communication, except the communication is between two specific devices, i.e., is "one-to-one" communication. Client server communication is used for operator access data (such as set point and tuning changes) and diagnostic data.

With regard to diagnostics, an asset monitoring software program (or simply "asset monitor") in a central control system may periodically request (poll) diagnostic data from devices in the fieldbus network. The diagnostic data is pooled from the devices and periodically sent to the asset monitoring software program. This polling of diagnostic data, however, creates a substantial load on the slow H1 link of the fieldbus network. In order to reduce the network traffic on the H1 link, the asset monitor could only subscribe to alarms and events (alerts) reporting equipment status, thereby eliminating the need to continuously poll the devices for diagnostic data. The downside to this approach, however, is that there is not enough information in the alerts to assess the health of the devices. Furthermore once such a maintenance alert has been activated, no new maintenance alert will be produced until the previous maintenance alert is deactivated (returns to normal).

Based on the foregoing, there is a need for an improved system and method for providing diagnostic information from FF devices to an asset monitor. The present invention is directed to such a system and method.

SUMMARY OF THE INVENTION

In accordance with the present invention, a method and a computer program product are provided for monitoring a field device in an enterprise having an industrial process. A computer system is connected to the field device. The computer system has a viewing monitor, memory with first and second server software programs stored thereon and a processor for executing the first and second server software programs. The first server software program is operable through an activated subscription to provide event notifications from the field device, and the second server software program is operable through an activated subscription to provide diagnostic data from the field device. A subscription to the first server software program is activated. A subscription to the second server software program is activated only after an event notification is received. Diagnostic data from the second server software program is received and device health information is generated from the diagnostic data. The device health information is displayed on the viewing monitor and the subscription to the second server software program is deactivated.

BRIEF DESCRIPTION OF THE DRAWINGS

The features, aspects, and advantages of the present invention will become better understood with regard to the following description, appended claims, and accompanying drawings where:

FIG. 4 is a screen shot of a plant explorer workplace in a graphical user interface of the process automation system;

FIG. 5 is a flowchart of a software routine of an asset monitor of the asset optimization system;

FIG. 6 is a screen shot of a condition details view in the graphical user interface of the process automation system;

FIG. 8 is a screen shot of a fault report view in the graphical user interface of the process automation system; and FIG. 9 is a screen shot of a submit fault report view in the graphical user interface of the process automation system

DETAILED DESCRIPTION OF EXEMPLARY EMBODIMENTS

Figure 1:
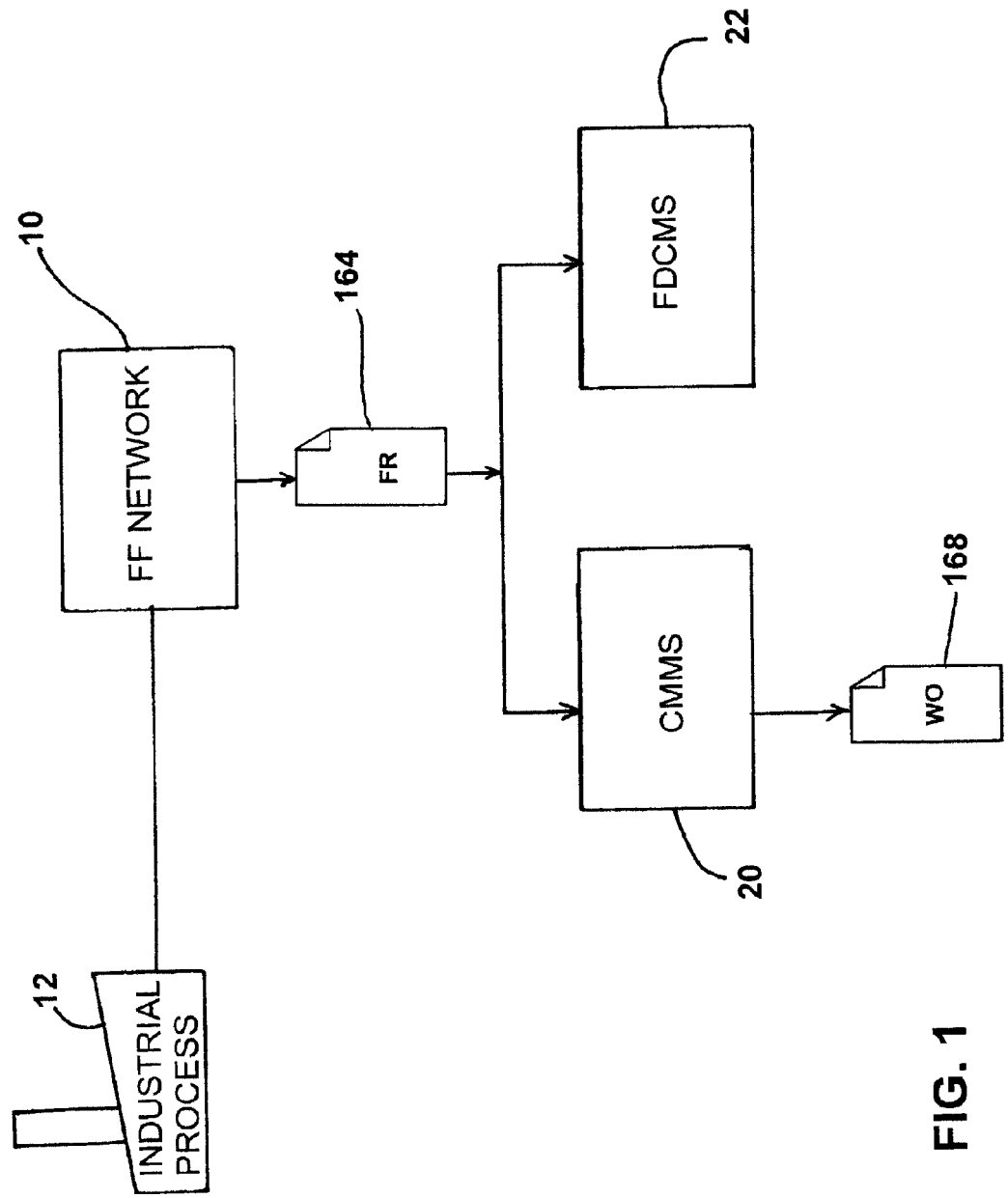
FIG. 1 is a schematic drawing showing an enterprise having a fieldbus network for controlling an industrial process.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Referring now to FIG. 1 there is shown a schematic drawing of an enterprise having an FF control network 10 for controlling an industrial process 12, such as a power generation process or a chemical manufacturing process. The FF control network 10 includes a process automation system 14 connected by a network 16 to smart field devices 18. The FF control network 10 may be connected to a computerized maintenance management system (CMMS) 20 and a field device calibration and management system (FDCMS) 22 through the network 16. A strategic maintenance management software package sold under the tradename MAXIMO® by MRO Software, Inc. has been found suitable for use as the CMMS 20, while a device management software package sold under the tradename DMS by Meriam Process Technologies has been found suitable for use as the FDCMS 22.

Figure 2:
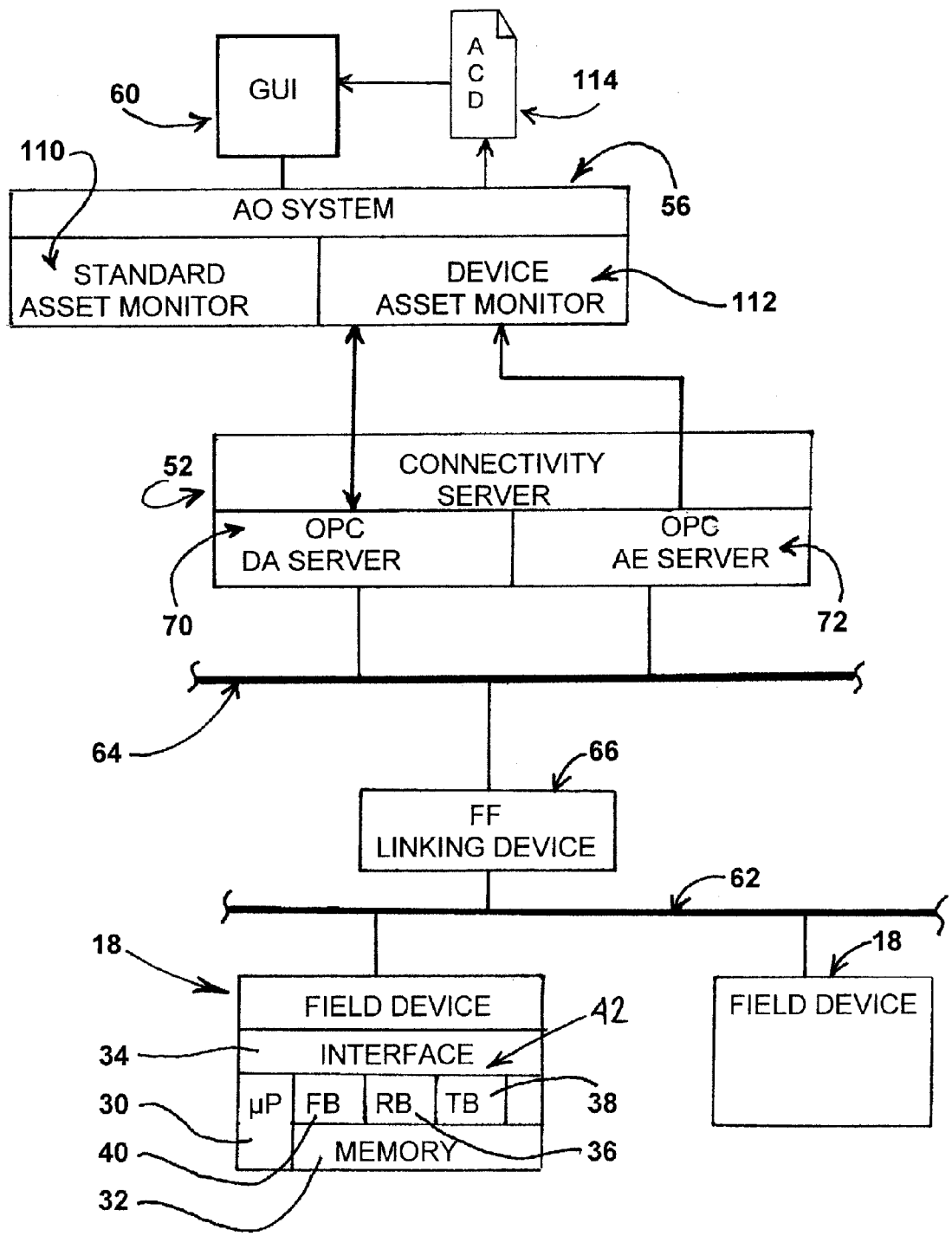
FIG. 2 is a schematic drawing showing field devices connected by a connectivity server to an asset optimization system.

Referring now to FIG. 2, the field devices 18 include monitoring devices (such as transmitters) and control devices (such as valves and drives) for monitoring and controlling the industrial process. Each smart field device 18 complies with the FF standard and includes a microprocessor 30, memory 32 and an interface 34 for connecting the field device 18 to the network 16. The memory 32 includes volatile memory, such as random access memory (RAM) and non-volatile memory, such as electrically erasable programmable read only memory (EEPROM) or flash memory. The field devices 18 communicate operating values of the industrial process 12 and other data to the process automation system 14 through the network 16 using the FF communication stack. Each field device 18 includes a plurality of blocks 42, each of which comprises a software algorithm. More specifically, each field device 18 comprises a resource block 36, a transducer block 38 and at least one function block 40.

The resource block 36 in each field device 18 is stored in non-volatile memory and retains information about the field device 18. This information includes: manufacturer identification, type of device, revision level, memory size, free memory space, available computational time, diagnostic information, declaration of available features and the state of the device, i.e., initializing, on-line, standby, failure, etc. Other information that may be stored in the resource block 36 includes construction details and schematics, calibration data and records and repair records.

The transducer block 38 in each field device 18 provides an interface between a sensor (e.g. temperature, pressure, etc.) or an actuation component of the field device 18 and function blocks 40 in the field device 18. The transducer block 38 may also perform functions, such as linearization and calibration.

In each field device 18, each function block 40 performs a specific set of operations on one or more inputs to generate one or more outputs. Some of the function blocks 40 that may be stored and implemented in the field devices 18 include an analog in (AI) function block, an analog out (AO) function block, a discrete in (DI) function block, a discrete out (DO) function block, a proportional, integral derivative (PID) control function block, a bias/gain (BG) station function block and a ratio (RA) station function block. By way of example, a field device 18 that is a temperature transmitter may contain an (AI) function block and another field device 18 that is a control valve might contain a PID function block as well as an AO function block. In this manner, a complete control loop can be built using only a simple transmitter and a control valve.

A field device 18 is operable to provide notification of a change in the status quo through the issuance of an alert. There are three causes for the generation of an alert, namely a process alarm, a static revision and a block alarm.

A process alarm is generated when a process variable, such as a temperature or a pressure, exceeds a limit. For a particular process variable, there are multiple levels of process alarms, e.g., "HI" and "HI HI".

A static revision is a change in a static parameter of a function block 40. Static parameters are configured or written to a field device 18 and normally change infrequently.

Examples of static parameters include process alarm limits, scaling data, option selections, filter values and controller tuning parameters.

Each block 42 (i.e., the transducer block 38, the resource block 36 and the function blocks 40) within a field device 18 is capable of providing an alarm notification or reporting parameter BLOCK_ALM and an alarm description or condition parameter BLOCK_ERR. The BLOCK_ALM enables a block 42 to report that one or more alarm conditions have been detected by that block 42. The BLOCK_ERR defines which one or more of sixteen different possible alarm or alert conditions are responsible for the BLOCK_ALM. The BLOCK_ERR parameter includes sixteen bits, each of which represents one of sixteen predefined possible alarm or alert conditions ("standard block alarms") that can occur in connection with a particular block of a particular field device 18. The sixteen standard block alarms include block configuration, link configuration, simulation, override, fault state, maintenance needed soon, maintenance needed now, input failure, output failure, memory failure, lost static memory, lost nonvolatile memory, readback failure, power up, out of service and an "other" alarm or alert condition. Every block 42 cannot produce all sixteen standard block alarms. For example, the resource block 36 can only produce the "fault state", "simulate" and "out of service" block alarms.

The standard block alarms for a block 42 are determined by the software algorithm of a block 42. For example, the software algorithm of a block 42 in a field device 18 may determine that there is a "maintenance needed soon" standard block alarm if the temperature within the field device 18 is too high, or a measured process variable is out of range, or a sensor is degraded as determined by the detection of excess EMF. The software algorithm may also determine that there is a "maintenance needed soon" standard block alarm if the amount of time the field device 18 has been in operation without maintenance exceeds a threshold time limit, or the number of times the field device 18 performs a certain task exceeds a threshold number. The software algorithm of a block 42 in a field device 18 may determine that there is a "maintenance needed now" standard block alarm if a sensor is determined to be open or shorted.

In addition to the sixteen standard block alarms, a block 42 may have additional block alarms. For example, a field device 18 which is a gage pressure transmitter may have a transducer block 38 with additional alarms that include: pressure sensor fail, temperature sensor fail, pressure sensor electronic fail, pressure sensor mechanical fail, EEPROM 1 fault, EEPROM 1 RO fault, EEPROM 1 fault writing, EEPROM 2 fault writing, over pressure side +, over pressure side −, ST out high limit, ST out low limit, SP out high limit, PV out high sensor limit, PV out low sensor limit, database invalid and sensor invalid.

When an alert occurs, the function block 40 time stamps the alert with the time the alert is first detected. An alert notifier program in the function block 40 builds a data set for the alert including cause of the alert, address, manufacturer type and other information and then uses this data set to construct an event notification message. An event notification message from a function block 40 is broadcast to the network 16 at the earliest opportunity short of interfering with the requirements for control communications. In the case of multiple active event notification messages, the event notification message with the highest priority will be broadcast first. In the case of equal priority, the event notification messages will be sent in order of age. Once an event notification message is sent, the alert notifier program in the function block 40 waits for a confirmation that a host (link master) has received the event notification message. If a confirmation is not received within a predetermined period of time, the alert notifier program sends the event notification message again. The alert notifier program repeats this procedure until a confirmation is received.

Figure 3:
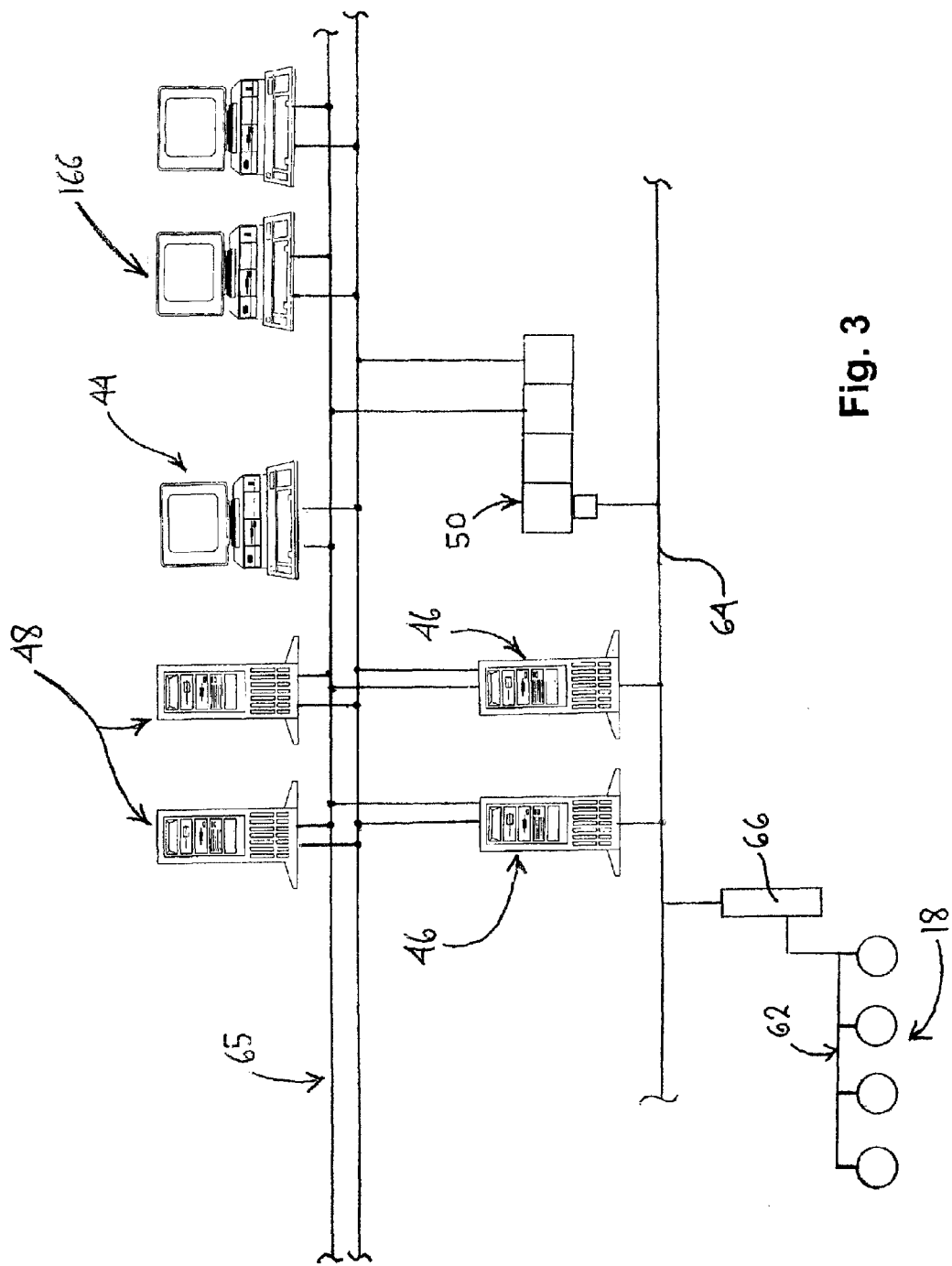
FIG. 3 is a schematic drawing of a process automation system connected to the field devices and including the connectivity server and the asset optimization system.

Referring now to FIG. 3, the process automation system 14 is a distributed control system, such as a System 800xA distributed control system, which is commercially available from ABB Inc. of Wickliffe, Ohio. The process automation system 14 generally includes at least one control work station 44, one or more connectivity server computers 46, one or more aspect server computers 48 and one or more controllers 50. A connectivity server 52 runs on the connectivity server computer(s) 46 and an aspect server runs on the aspect server computer(s) 48. An asset optimization system 56 runs on the control work station 44 or another server computer (not shown).

The controller(s) 50 contain(s) control programs for controlling the industrial process 12 using process data from the field devices 18. The control programs are written in one or more of the five IEC 61131-3 standard languages: Ladder Diagram, Structured Text, Function Block Diagram, Instruction List and Sequential Function Chart. Outputs from the control programs are transmitted to the control devices of the field devices 18 over the network 16 using the FF communication stack.

The control work station 44 is a personal computer (PC) with a central processing unit (CPU) and a monitor for providing visual displays to an operator. The CPU has an operating system running thereon, which is a Windows® operating system available from Microsoft Corporation. A graphical user interface (GUI) 60 runs on the operating system of the control work station 44.

The network 16 interconnects the control work station 44, the connectivity and aspect server computers 46, 48, the controller(s) 50 and the field devices 18. The network 16 includes an H1 segment 62, an HSE segment 64 and a server network 65. The H1 segment 62 may comprise shielded twisted pair wires over which data is transmitted at a data rate of 31.25 kilobits/second. The HSE segment 64 may comprise an Ethernet cable over which information is communicated at a data rate of 100 megabits/second or greater using the Manufacturing Message Specification (MMS) communication protocol and a reduced OSI stack with the TCP/IP protocol in the transport/network layer. The server network 65 may be a redundant pair of Ethernet cables. The H1 segment 62 is connected to the HSE segment 64 by an FF linking device 66, which operates as a link master. The FF linking device 66 may be an LD 800HSE, which is commercially available from ABB Inc. of Wickliffe, Ohio.

The connectivity server 52 includes a server network based on object linking and embedding for process control (OPC), which is a set of standard interface protocols established by the OPC Foundation, a non-profit corporation located in Scottsdale, Ariz. OPC is based upon the functional requirements of Microsoft's object linking and embedding (OLE), component object model (COM) and distributed component object model (DCOM) technologies. OPC includes a number of specifications, including the OPC Data Access Custom Interface Standard (OPC DA) and the OPC Alarms and Events Custom Interface Standard (OPC AE). The OPC AE describes objects and interfaces which are implemented by OPC AE servers and which provide the mechanisms for OPC clients to be notified of the occurrence of specified events and alarm conditions. The server network includes an OPC DA server 70 and an OPC AE server 72.

The OPC DA server 70 operates in accordance with OPC DA, Version 3.00. The OPC DA server 70 provides OPC clients with access to real time process data and device diagnostic data from the FF control network 10. The OPC DA server 70 is comprised of three different types of objects: a server object, a group object and an item object. The server object maintains information about the OPC DA server 70 and serves as a container for group objects. A group object maintains information about itself and provides the mechanism for containing and logically organizing item objects. Group objects provide a way for clients to organize data. For example, a group object might represent item objects in a particular display screen of the GUI 60. Each item object has three values associated with it: a value, a timestamp and a quality indicator. Data can both be read and written. Exception based connections can also be created between the client and item objects in the group object and can be enabled and disabled as needed. From the perspective of a client, the OPC DA server 70 presents a list of item objects that are available to the client. The client chooses which items to use, how to organize them and how to use them. The client can choose to read, write or receive unsolicited updates for an item object. More specifically, a client can issue synchronous calls, asynchronous calls and refresh calls and can enter into and out of subscriptions. When a client issues a synchronous read, the OPC DA server 70 does not release the control to the calling thread before the requested values are returned. Synchronous writes are also possible. When a client issues an asynchronous read, the OPC DA server 70 returns control immediately to the calling thread and later sends, using a predefined communication path, the requested values. Asynchronous writes are also possible. The synchronous and asynchronous calls require that clients specify the list of values that have to be read or written. These mechanisms operate by polling and are used when a client needs to access a device from time to time. Refresh and subscriptions are callback mechanisms. They are used to access predefined sets of data points. When a client issues a refresh call, the OPC DA server 70 returns asynchronously the current values of the predefined set of data points using a predefined communication path. A subscription is an event based mechanism. When a client has an active subscription with the OPC DA server 70, the OPC DA server 70 notifies the client when significant changes occur within a predefined set of data point. A client can activate and deactivate the sending of subscription callbacks related to a group. This is done by setting/clearing the "Enable" attribute of a group.

The OPC AE server 72 operates in accordance with OPC AE, Version 1.10. The OPC AE server 72 collects alarms and events from the FF control network 10 and reports them to one or more OPC clients. An alarm is an abnormal condition that requires attention, and is a special case of a condition. A condition is associated with a source, such as a field device 18, or the process automation system 14. For example, a condition can be a "Level Alarm" for a field device 18. A condition may be single state or multi-state. A multi-state condition has a plurality of sub-conditions. For example, the condition "Level Alarm" may have sub-conditions "HI" and "HI HI". The sub-conditions of a multi-state condition are mutually exclusive, e.g., the "Level Alarm" cannot both be in "HI" and "HI HI". A single state condition has a single sub-condition that is either "yes" or "no". For example, a field device 18 can have a "Fault State Set" condition, which has a sub-condition of either "yes" or "no".

Each sub-condition has the attributes: name, definition, severity and description. The name of a sub-condition must be unique within its associated condition, i.e., two sub-conditions cannot have the same name. The definition is an expression which defines the sub-state represented by the sub-condition. The severity is a numerical value indicating the urgency of the sub-condition. Severity values range from 1 to 1000 with 1 being the lowest severity and 1000 being the highest. Typically, a severity of "1" would indicate an event of an informational nature, while a value of 1000 would indicate an event of catastrophic nature which could potentially result in severe financial loss and/or injury to personnel. The severity values may be grouped into levels having ranges of severity values, such as a low level of 1-200, a medium low level of 201-400, etc.

An event is a detectable occurrence that is of significance to the OPC AE server 72 and its clients. An event may or may not be associated with a condition. For example, transitions into the "Fault State Set" condition and the return to normal are events which are associated with conditions. Operator actions and configuration changes and errors in the process automation system 14 are examples of events that are not associated with specific conditions. In summary, there are three types of events: condition-related events, tracking-related events and simple events. In addition, events are grouped into categories, including "process events" and "system events".

Simple events are typically informational messages that do not require any particular action to be taken. Examples of simple events are messages from the process automation system 14, such as startup or shutdown, operator logon or logoff; and device failure messages. Simple events have the following attributes: source, time, type, event category, severity and message.

Condition-related events are associated with conditions, and represent transitions into or out of the states represented by the conditions and sub-conditions. An example is the transitioning into and out of the "Fault State Set" condition. Condition-related events include all categories of alarms and generally require some sort of response or acknowledgement by a user or operator. Condition-related events have the same attributes as simple events and further include the following attributes: condition name, sub-condition name, change mask, new state, condition quality, acknowledgement required, active time, cookie and actor ID.

Tracking-related events are not associated with conditions, but represent occurrences which involve the interaction of a client with a "target" object within the OPC AE server 72. An example of such an event is a control change in which an operator (a client) changes a setpoint of a tag (the "target"). Tracking-related events have the same attributes as simple events and further includes an actor ID attribute.

The OPC AE server 72 notifies clients of events through event notifications. A client can subscribe to event notifications from the OPC AE server 72. A client can have more than one subscription with the OPC AE server 72. Each subscription has a filter that contains criteria for selecting events of interest to the client. A null filter results in a client receiving all event notifications. The criteria for a filter includes: type of event, i.e., simple, condition or tracking; event categories, i.e., process or system; lowest severity, i.e., all events with a severity greater than or equal to the specified severity; highest severity, i.e., all events with a severity less than or equal to the specified severity; process areas; event source communication problems; and client communication problems.

The aspect server running on the aspect server computer(s) 48 includes an aspect directory containing all aspect objects and their aspects, as well as an aspect framework (AFW) server. The AFW server is operable to wrap together HTML pages (aspects) for an object in a web-compliant AFW file that can be launched from an object tree in the GUI 60. The aspect server implements a method of organizing information using aspect objects (or simply "objects") and aspects associated with the objects. An object represents physical matter (such as a field device 18) or virtual matter (such as a function) and acts as a holder or container for information (such as run time data) concerning the object. Information concerning an object is contained in its aspects. An aspect is an assembly of information describing certain properties of an object, such as functional properties, physical construction properties and location properties. Information in an aspect is presented in a view, which may be a list, a table, a diagram, a drawing, or a graphic. An aspect may have more than one view. An aspect object methodology that may be utilized is set forth in U.S. Pat. No. 6,694,513 to Andersson et al., which is hereby incorporated by reference.

The aspect object methodology of the process automation system 14 utilizes a plurality of object hierarchies or structures, including: aspect system, functional, locational and control. The aspect system structure contains all aspects, their types and categories. The functional structure shows where a particular object fits into a functional context. For example, the functional structure would show which field devices 18 are associated with each control loop. The locational structure shows where an object fits into the physical (geographical context). For example, the locational structure would show exactly where in the industrial process 12 a particular field device 18 is located. The control structure shows where a software function or hardware device can be found in the process automation system 14. For example, the control structure would show which analog/digital output signals control a field device 18 which is a valve, which output boards carry the output signals and how these signals connect to the control program controlling the field device 18.

In the GUI 60, objects and aspects are graphically represented by icons. In the description below, when reference is made to an object or aspect, it should be understood that the reference may be to the icon for the object or aspect and/or to its associated object or aspect, depending on the context.

Figure 4:
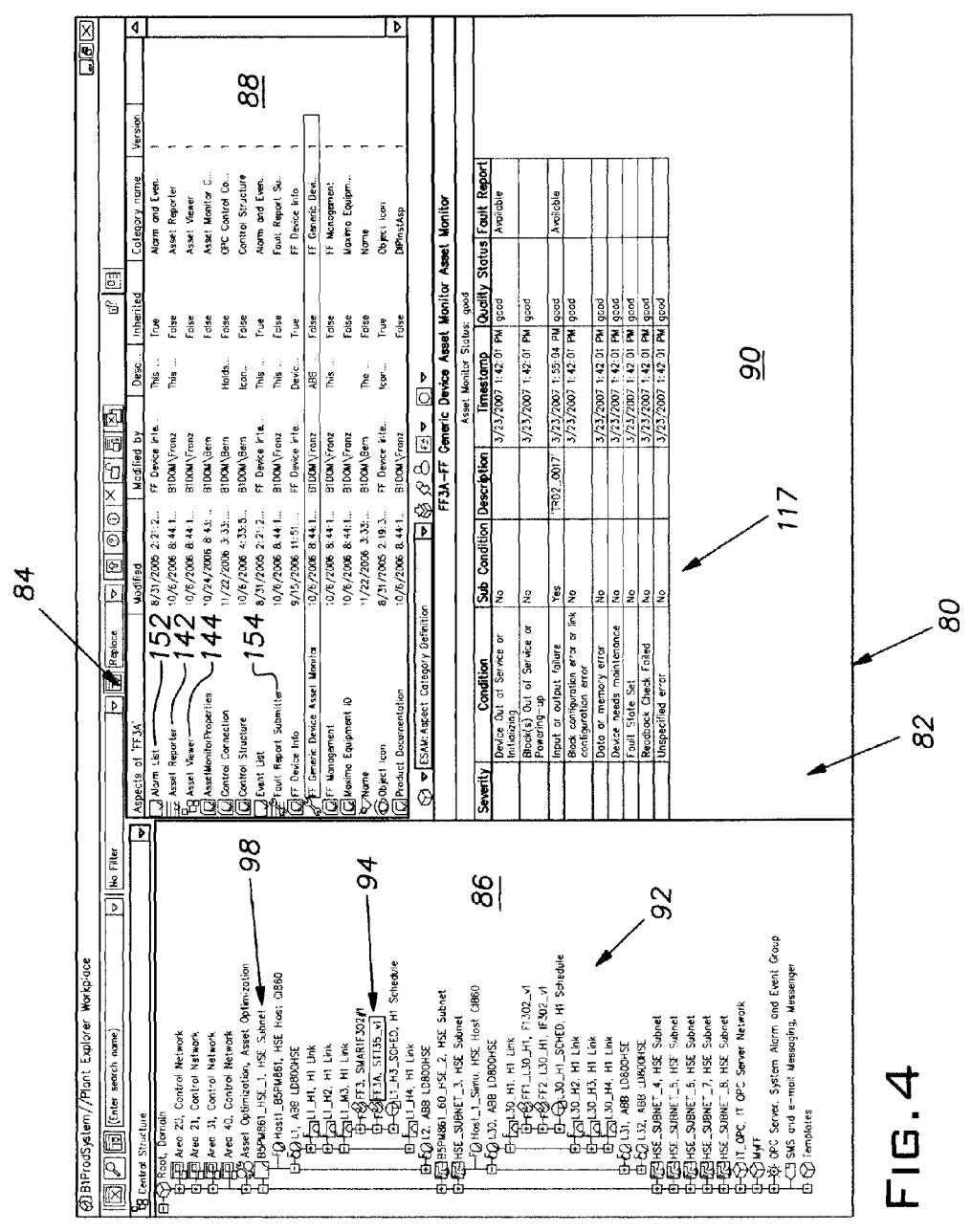

The GUI 60 has a client/server architecture and has communications based on OPC. A suitable human system interface that may be utilized for the GUI 60 is Process Portal™, which is commercially available from ABB Inc. The GUI 60 has a plurality of workplaces that may be utilized. Each workplace comprises a collection of user-interactive functions (such as tool bars, faceplates, windows, pull-down menus, buttons, scroll bars, iconic images, wizards, etc.) that are combined for a particular use, such as controlling the industrial process 12. Enterprise personnel may select a particular workplace from a workplace login page of the GUI 60. Three of the workplaces that may be selected are an operator workplace, a plant explorer workplace 80 and a maintenance workplace. Referring now to FIG. 4, the plant explorer workplace 80 is used to explore and build hierarchically structured models of the industrial process 12, while the operator workplace is configured for process operators responsible for controlling the industrial process 12. The maintenance workplace organizes and arranges asset information for maintenance personnel in a way that is needed for efficient daily activities. The plant explorer workplace 80 and the maintenance workplace each include a main window 82 comprising an application bar 84 and a plurality of frames or areas, including an object area 86, an aspect list area 88 and, selectably, a preview area 90. The application bar 84 includes a fixed display area, a tool collection and shortcuts. The object area 86 is where an object browser displays an object tree 92, which is a list or tree of objects for a selected object structure (functional, locational or control), with each root object at a top level and its child objects at a lower or leaf level. An object can be accessed by right clicking on the object in an object tree, which opens a context menu containing a number of actions that can be performed. The aspect list area 88 displays all aspects of a currently selected object in an object tree 92. If the preview area 90 is enabled, the preview area 90 displays the view of an aspect currently selected in the aspect list area 88. If the preview area 90 is not enabled, the view of a selected aspect is displayed as a pop-up window. The view of an aspect can also be displayed in the main window 82.

In the GUI 60, all of the field devices 18 of the FF control network 10 are represented by objects 94 that may be child objects of an HSE subnet object 98 for the HSE segment 64 and will hereinafter referred to as "device objects" 94.

The asset optimization system 56 integrates asset monitoring and decision support applications with the GUI 60, as well as typically the CMMS 20 and the FDCMS 22. The asset optimization system 56 interacts with the connectivity server 52 to receive information from the field devices 18 over the network 16, as will be described more fully below. The asset optimization system 56 includes standard asset monitors 110 and device asset monitors 112 for the field devices 18. The asset optimization system 56 further includes an asset monitoring server and a software development kit (SDK) with an add-in spreadsheet program. The SDK may be based on the Visual Basic® program language and development environment available from Microsoft Corporation and the spreadsheet program may be the EXCEL™ spreadsheet program, which is also available from Microsoft Corporation. Each of the standard asset monitors 110 and device asset monitors 112 is a software routine that may be written in Visual Basic® using the SDK and has parameters that are defined using the spreadsheet program. The asset optimization system 56 may have an architecture substantially in accordance with the AO architecture described in U.S. patent application Ser. No. 09/770,167 (Publication Number US2002/0103828A1), which is assigned to the assignee of the present invention and is hereby incorporated by reference.

The standard asset monitors 110 can be configured to perform Boolean checks, quality checks, runtime accumulation checks, high, low, high/low limit checks, XY profile deviation checks and flow delta checks. A condition of a standard asset monitor 110 can be an operating characteristic (such as vibration) of an asset being monitored (such as a motor), while a subcondition can be the quality or status of the condition (such as "normal" or "extreme"). A standard asset monitor 110 can be configured such that if a subcondition is met or is present (such as "extreme"), the standard asset monitor 110 creates an asset condition document 114 containing all information necessary to describe an asset condition.

In the following description, only one device asset monitor 112 is described, it being understood that the other device asset monitors 112 are substantially the same, except as otherwise noted. A device asset monitor 112 interacts with the OPC DA server 70 and the OPC AE server 72 to obtain data from its associated field device 18. The device asset monitor 112 has a subscription with the OPC DA server 70 to receive data from the field device 18, including diagnostic data from the resource block 36 and the transducer block 38 of the field device 18. The subscription between the device asset monitor 112 and the OPC DA server 70 is deactivated under normal conditions, i.e., the device asset monitor 112 does not receive data concerning its corresponding field device 18 from the OPC DA server 70 under normal conditions. The device asset monitor 112, however, has a subscription to the OPC AE server 72 to receive event notifications from the OPC AE server 72. The filter for the subscription may be to transmit all standard block alarms and additional block alarms received from the field device 18. The filter for the subscription may be more particular and may, by way of example, be limited to just transmitting standard block alarms. The filter for the subscription may be even more particular and may, by way of example, be limited to just transmitting "maintenance needed soon" and "maintenance needed now" block alarms.

When the device asset monitor 112 receives an event notification from the OPC AE server 72 for the field devices 18, the subscription between the device asset monitor 112 and the OPC DA server 70 is activated so that the device asset monitor 112 receives data from the blocks 42 in the field device 18 and, in particular, detailed diagnostic data from the resource block 36 and the transducer block 38. The device asset monitor 112 uses the data to display information about the event notification in the GUI 60, including a suggested corrective action and diagnosed probable cause, as will be described in more detail below. The device asset monitor 112 also generates an asset condition document 114 containing the diagnosed probable cause and suggested corrective action.

When the alarm condition giving rise to the event notification is deactivated, i.e., the alarm condition is acknowledged and/or returns to normal, the subscription between the device asset monitor 112 and the OPC DA server 70 is deactivated so that the device asset monitor 112 no longer receives data from the OPC DA server 70. This frees up bandwidth resources that the transmittal of the diagnostic data imposes on the H1 segment 62 of the network 16.

Referring now to FIG. 5, there is shown a flowchart of a routine 116 performed by the device asset monitor 112. The routine 116 starts at step 120 when an event notification from the OPC AE server 72 or diagnostic data from the OPC DA server 70 is received. If an event notification or diagnostic data has been received, the routine 116 then proceeds to step 122, wherein a determination is made whether there is an event notification from the field device 18. If there is no event notification, the routine 116 proceeds to step 124 wherein a determination is made whether the subscription between the OPC DA server 70 and the device asset monitor 112 is active. If there is an active subscription, the routine 116 first proceeds to step 126, wherein the subscription is deactivated, and then to step 128, wherein the conditions of the device asset monitor 112 are set to a normal state. If there is no active subscription, the routine 116 proceeds directly to step 128.

If a determination is made in step 122 that there is an event notification, an inquiry is made in step 130 whether the device asset monitor 112 has an active subscription to the OPC DA server 70. If there is no active subscription, the subscription to the OPC DA server 70 is activated in step 134 and then the conditions of the device asset monitor 112 are set to a normal state in step 128. If it is determined in step 130 that the subscription is active, the conditions of the device asset monitor 112 are updated in step 136 using the diagnostic data received from the OPC DA server 70.

After either step 128 or step 136, the routine proceeds to step 138, wherein the asset conditions are reported to the GUI 60 and/or an asset condition document 114 is generated and transmitted. The routine 116 then returns to the first step 120.

Referring back to FIG. 4, the device asset monitor 112 is provided as an aspect 115 to the object 94, which, as set forth above, is a child object to the HSE subnet object 98 in the plant explorer workplace 80. The aspect 115 provides a detailed view 117 in the preview area 90 of the conditions of the device asset monitor 112. If the device asset monitor 112 is "generic", the device asset monitor 112 has conditions based only on the standard block alarms from the field device 18. Each condition may correspond directly to a standard block alarm or may be based on a combination of standard block alarms. For example, the view 117 of the asset monitor 112 shown in FIG. 4 has the conditions: device out of service or initializing, blocks out of service or powering up, input or output failure, block configuration error or link configuration error, data or memory error, device requires maintenance, fault state set, readback check failed and unspecified error. If the device asset monitor 112 is "custom", the device asset monitor 112 may have conditions based on the standard block alarms as well as additional block alarms. For example, the field device 18 that is a gage pressure transmitter (described above) may have the following conditions: static pressure sensor, temperature sensor, pressure sensor update, mechanical error, critical sensor memory error, non-critical sensor memory error, electronics memory error, sensor memory burn failure, electronics memory burn failure, overpressure check, overtemperature check, over static pressure check, pressure out of sensor limit check, sensor database check and sensor type check.

As shown in FIG. 4, the view 117 lists all of the conditions of the device asset monitor 112 and for each condition displays a severity, the sub-condition(s), a description, a time stamp, a quality stamp and the availability of a fault report. Right clicking on a condition in the view 117 produces a pop-menu through which additional views can be accessed, namely a condition details view 118, an asset monitor status view, a submit fault report view 158 and a create fault report view. The condition details view 118 (shown in FIG. 6), displays a time stamp, severity, description, possible cause, suggested action and the corrective action taken.

Each of the asset condition documents 114 generated by the standard asset monitors 110 and the device asset monitors 112 is an XML file and is transmitted to the GUI 60. Each asset condition document 114 may also be reformatted and sent to a system message service for delivery to plant operating personnel via email and/or pager. The system message service permits plant operating personnel to subscribe to a plurality of asset monitors 110, 112 for which the plant operating personnel desire to receive status change information.

Asset Reporter and Viewer (Including Thin Client)

Referring back to FIG. 4, an asset reporter aspect 142 may be provided for the HSE subnet object 98 and for each of the device objects 94. Asset reporter aspects 142 may also be provided for the other objects with asset monitors. An asset reporter aspect 142 for an object provides a detailed view of all asset monitor conditions and subconditions for an asset represented by the object. In addition, the asset reporter aspect 142 displays a severity indicator for the object itself.

Figure 7A:
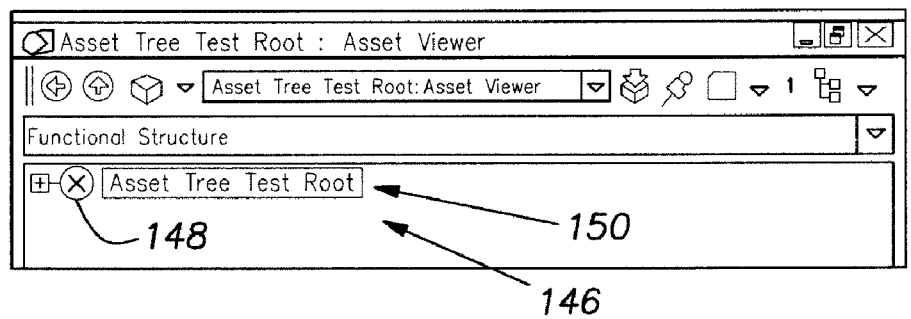
FIG. 7A is a screen shot of an asset condition tree in a collapsed mode in the graphical user interface of the process automation system.
Figure 7B:
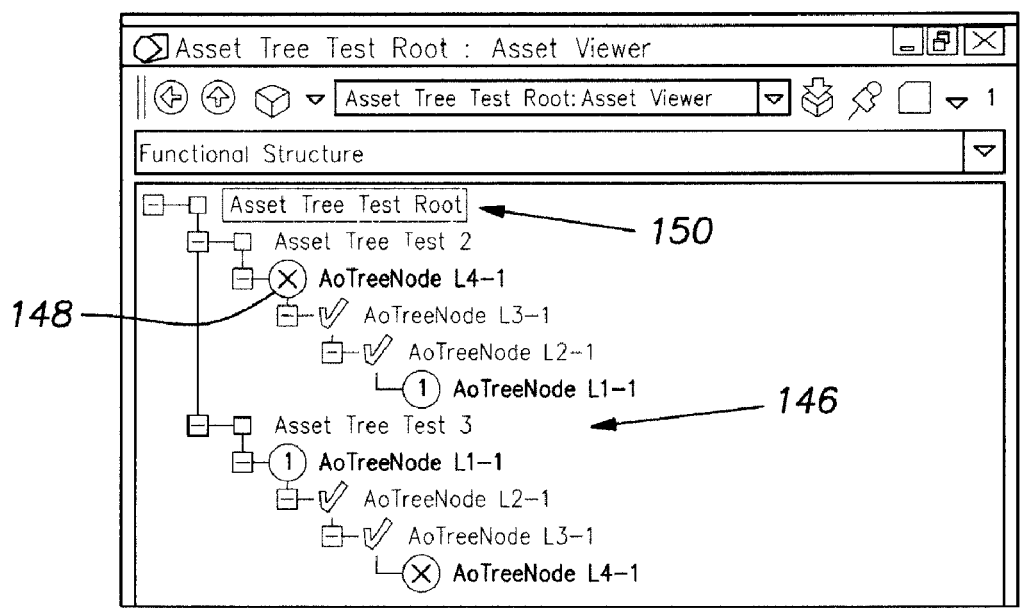
FIG. 7B is a screen shot of the asset condition tree in an expanded mode in the graphical user interface of the process automation system.

Asset viewer aspects 144 are also provided for the device objects 94. Asset viewer aspects 144 may also be provided for the other objects with asset monitors. For a particular object, the asset viewer aspect 144 associated with the object displays the object and all of its child objects in an asset condition tree 146 in the object area 86 of the plant explorer workplace 80, as well as in the operator workplace. An example of an asset condition tree 146 is shown in FIGS. 7A and 7B. In FIG. 6A, the asset condition tree 146 is expanded and in FIG. 7B, the asset condition tree 146 is expanded. The asset viewer aspect 144 is also accessible as a web-enabled view on a remote client that is not part of the process automation system 14, i.e., a thin client. A thin client, accesses the asset viewer aspect 144 through a web server on the machine hosting the asset monitoring server.

The statuses of the objects in an asset condition tree 146 are displayed via icons 148 associated with the objects, respectively. When the asset condition tree 146 is collapsed (as in FIG. 7A), the icon 148 for a root object 150 shows the propagated severity, quality and fault report availability for the root object 150 and all of the child objects beneath it. When the asset condition tree 146 is expanded (as shown in FIG. 7b), the asset condition tree 146 shows the composite severity, quality and fault report availability for all asset monitor objects below the root object 150. The form of an icon 148 for an object is based on the highest severity number of the subconditions from the asset monitors of the child objects. For example, when all of the subconditions have a severity number of one, the icon 148 will be a check mark, which indicates normal subconditions; when the highest severity number of the subconditions is between 2 and 250, the icon 148 will be an "i" in a white bubble, which indicates a non-normal subcondition of low severity; when the highest severity number of the subconditions is between 251 and 500, the icon 148 will be a blue flag, which indicates a non-normal subcondition of medium severity; when the highest severity number of the subconditions is between 501 and 750, the icon 148 will be a yellow caution triangle, which indicates a non-normal subcondition of high severity; and when the highest severity number of the subconditions is between 751 and 1,000, the icon 148 will be a red circle with a cross through it, which indicates a non-normal subcondition of very high severity. The icons 148 may be preset, or may be configurable by enterprise personnel. In the operator workplace and the plant explorer workplace 80, the statuses of the objects in an asset condition tree 146 are dynamically updated. In a thin client view of an asset condition tree 146, however, the statuses of the objects are only updated through a manual refresh.

The statuses of the objects and the subconditions thereof that are displayed in an asset condition tree 146 and the asset reporters are determined by the asset condition documents 114 issued by the asset monitors 110, 112. When an asset monitor 110, 112 issues an asset condition document 114 for a change in status, the icon 148 displayed in the asset condition tree 146 and the color of the subcondition in the corresponding asset reporter are changed. In addition, if the change in status is from normal or OK to an abnormal condition, an alarm and an electronic fault report are automatically created.

NOTIFICATION (A&E). An alarm list aspect 152 is provided for the HSE subnet object 98 and each of the device objects 94. Alarm list aspects 152 may also be provided for the other objects with asset monitors. For each object with an alarm list aspect 152, the alarm list aspect 152 provides a view in the preview area 90 that shows all alarms and events generated by the object or any of its child objects, including the severity and time of occurrence of the alarms and events.

NOTIFICATION (CMMS). A fault report submitter aspect 154 is provided for each device object 94. Fault report submitter aspects 154 may also be provided for other objects with asset monitors. A fault report submitter aspect 154 may be accessed from the aspect list area 88, or from an asset condition tree 146 or an asset reporter by right clicking on the relevant icon 148 in the asset condition tree 146 or the subcondition in the asset reporter, as the case may be, which produces a pop-up context menu that provides access to the fault report submitter aspect 154. Each fault report submitter aspect 154 has a fault report view 156 that shows all fault reports for an associated asset monitor. For example, the fault report submitter aspect 154 for the device object 94 has a fault report view 156 that shows the fault reports that have been issued by the device asset monitor 112, as is shown in FIG. 8. Right-clicking anywhere in a fault report row produces a context menu with the option to dismiss or submit the fault report. If the fault report is to be submitted, a submit fault report view 158 is launched. For example, a submit fault report view 158 for the fault report submitter aspect 154 for the device object 94 is shown in FIG. 9. The submit fault report view 158 includes a description of the work that should be performed (work order) and a submit button 162. The work order (WO) description contains the fault diagnosis and recommended remedial action. When a user clicks the submit button 162 in the submit fault report view 158, an electronic fault report 164 (symbolically shown in FIG. 1), containing the information from the submit fault report view 158 is submitted to the CMMS 20 and the FDCMS 22. The fault report 164 may be an XML document.

Referring back to FIG. 3, the CMMS 20 runs on a CPU of a computer 166 that is connected to the process automation system 14 by network 16. The CMMS 20 generates, issues and tracks job plans, work orders and preventive maintenance schedules for the field devices 18. A work order 168 from the CMMS 20 is electronic and contains comprehensive and detailed information for work that needs to be performed on a field device 18. Such information includes a description of the work that needs to done and a plan and a schedule for performing the work. Such information also typically includes the amount, type and cost of labor, material and equipment required to perform the work. A work order 168 may also reference or include information from failure analysis and safety-related documents. A work order 168 is transmitted to maintenance personnel who will perform the work order to remedy the fault of the concerned field device 18.

When the CMMS 20 receives a fault report 164 from the process automation system 14 for a field device 18, the CMMS 20 creates a work order 168 for the field device 18. A work order aspect (not shown) is provided for each device object 94 and may be provided for other objects with asset monitors. A work order aspect for an object provides a view of all of the work orders that are open or active for an asset to which the object corresponds. A work order column in a view contains links to the CMMS 20. Clicking on a link for a particular work order opens a portal that contains a CMMS view of the work order 168.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. In an enterprise having an industrial process and a field device, a method of monitoring the field device comprising
connecting a computer system to the field device, wherein the computer system comprises a viewing monitor, memory with first and second server software programs stored thereon and a processor for executing the first and second server software programs, the first server software program being operable through an activated subscription to provide event notifications from the field device, and the second server software program being operable through an activated subscription to provide diagnostic data from the field device;
activating a subscription to the first server software program for a monitoring software program;
activating a subscription to the second server software program for the monitoring software program only after the monitoring software program receives an event notification from the first server software program;

receiving diagnostic data from the second server software program in the monitoring software program;

generating device health information from the diagnostic data in the monitoring software program;

displaying the device health information on the viewing monitor; and deactivating the subscription to the second server software program for the monitoring software program.

2. The method of claim 1, wherein the field device comprises memory with a plurality of software blocks stored thereon and a processor for executing the software blocks, and wherein one or more of the software blocks is operable to issue one or more alarms.

3. The method of claim 2, wherein the event notification received from the first server software program is generated by the first server software program from an alarm received from the one or more of the software blocks in the field device.

4. The method of claim 3, wherein the device health information comprises a probable root cause of the alarm and a suggested corrective action therefor.

5. The method of claim 3, wherein the subscription to the second server program for the monitoring software program is deactivated when the alarm is deactivated.

6. The method of claim 1, wherein the computer system has a graphical user interface (GUI).

7. The method of claim 6, wherein the device health information is displayed on the viewing monitor through the GUI.

8. The method of claim 7, further comprising generating an asset condition document in the monitoring software program using the event notification and the device health information and transmitting the asset condition document to the GUI.

9. The method of claim 8, wherein the asset condition document is an XML document.

10. The method of claim 8, further comprising transmitting the asset condition document to a maintenance management system.

11. The method of claim 1, wherein the device health information comprises the diagnostic information.

12. The method of claim 1, wherein the computer system comprises a plurality of computers.

13. A computer program product for execution on at least one processor of a computer system connected to a field device in an enterprise having an industrial process, the computer system comprising a viewing monitor, memory with first and second server software programs stored thereon and the at least one processor for executing the first and second server software programs, the first server software program being operable through an activated subscription to provide event notifications from the field device, and the second server software program being operable through an activated subscription to provide diagnostic data from the field device, the computer program product comprising:

non-transitory computer readable storage medium;

a monitoring software program comprising program instructions stored on the non-transitory computer readable storage medium and executable by the at least one processor to:

activate a subscription to the first server software program for the monitoring software program;

activate a subscription to the second server software program for the monitoring software program only after the monitoring software program receives an event notification from the first server software program;

receive diagnostic data from the second server software program in the monitoring software program;

generate device health information from the diagnostic data in the monitoring software program;

display the device health information on the viewing monitor; and deactivate the subscription to the second server software program for the monitoring software program.

14. The computer program product of claim 13, wherein the field device comprises memory with a plurality of software blocks stored thereon and a processor for executing the software blocks, one or more of the software blocks being operable to issue one or more alarms, and wherein the event notification received from the first server software program is generated by the first server software program from an alarm received from the one or more of the software blocks in the field device.

15. The computer program product of claim 14, wherein the device health information comprises a probable root cause of the alarm and a suggested corrective action therefor.

16. The computer program product of claim 14, wherein the program instructions deactivate the subscription to the second server program for the monitoring software program when the alarm is deactivated.

17. The computer program product of claim 13, wherein the at least one computer has a graphical user interface (GUI), and wherein the device health information is displayed on the viewing monitor through the GUI.

18. The computer program product of claim 17, wherein the program instructions are executable by the at least one processor to also:

generate an asset condition document in the monitoring software program using the event notification and the device health information; and transmit the asset condition document to the GUI.

19. The computer program product of claim 18, wherein the asset condition document is an XML document.

20. The computer program product of claim 18, wherein the program instructions are executable by the at least one processor to also transmit the asset condition document to a maintenance management system.

21. The computer program product of claim 13, wherein the device health information comprises the diagnostic information.

22. The computer program product of claim 13, wherein the at least one computer comprises a plurality of computers.

* * * * *